United States Patent

[11] 3,553,481

| [72] | Inventor | Harold W. Hasenbeck |
| | | 1524 Alameda St., Pomona, Calif. 91767 |
| [21] | Appl. No. | 747,154 |
| [22] | Filed | July 24, 1968 |
| [45] | Patented | Jan. 5, 1971 |

[54] AUTOMATIC SOIL WATERING SYSTEM
12 Claims, 8 Drawing Figs.

[52] U.S. Cl. ................................................. 307/118,
239/63; 324/65
[51] Int. Cl. .................................................. A01g 25/00
[50] Field of Search .......................................... 307/118;
338/34; 340/235; 324/65SM; 239/63

[56] References Cited
UNITED STATES PATENTS

| 2,721,101 | 10/1955 | Richard, Jr. ................. | 307/118UX |
| 2,793,527 | 5/1957 | Turner, Jr. et al. .......... | 338/34X |
| 3,113,724 | 12/1963 | DeBough ...................... | 239/63 |
| 3,182,914 | 5/1965 | Hosier ......................... | 239/63 |

Primary Examiner—Robert K. Schaefer
Assistant Examiner—T. B. Joike
Attorney—White & Haefliger ABSTRACT: The disclosure concerns automatic soil moisture control wherein irrigation is controlled in response to changes in resistance variation of a subsurface sensor or sensors, which changes are due to heat transfer as a function of soil moisture variation.

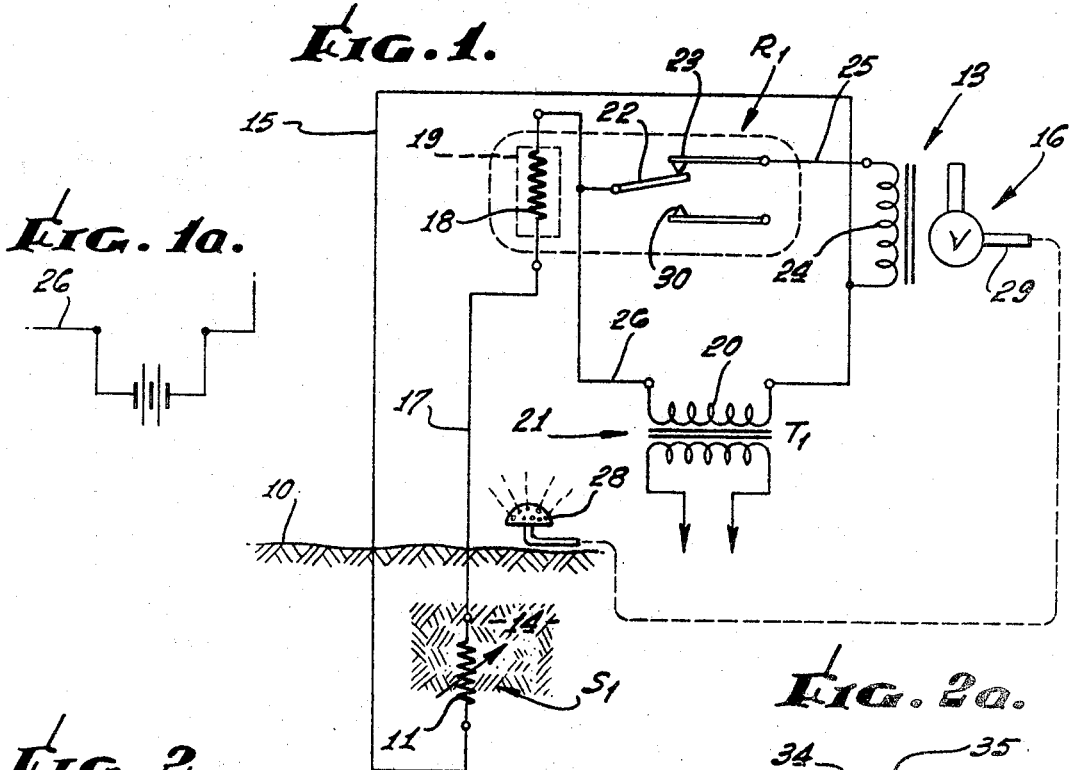
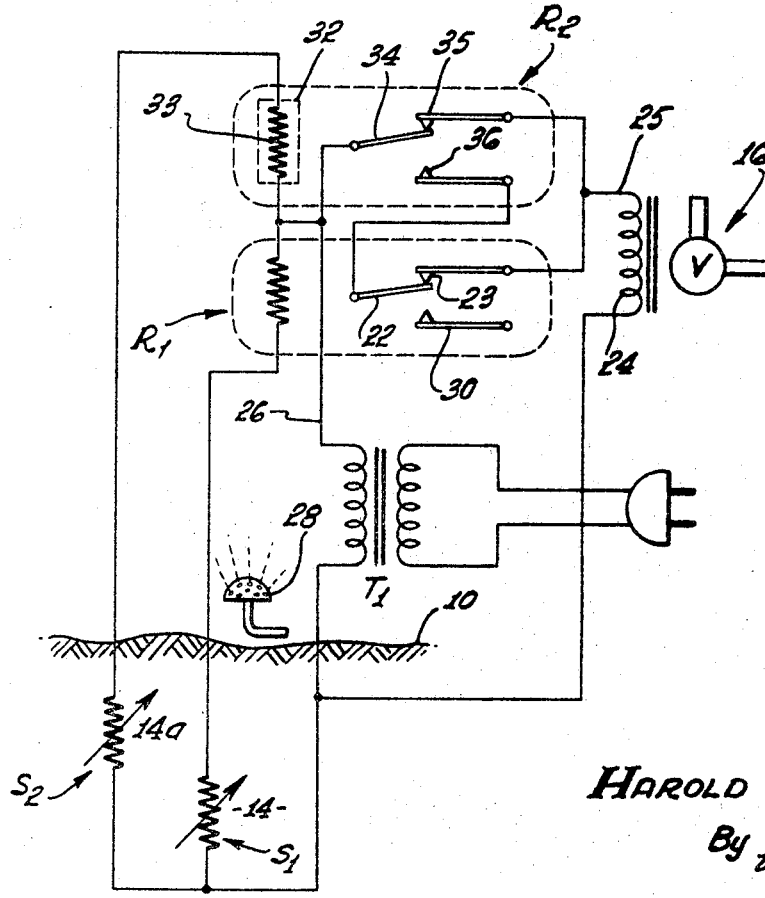
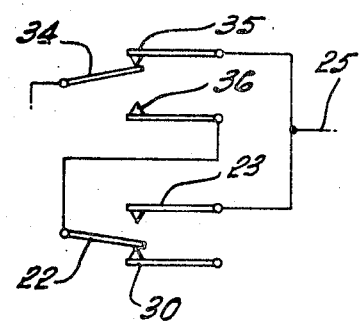
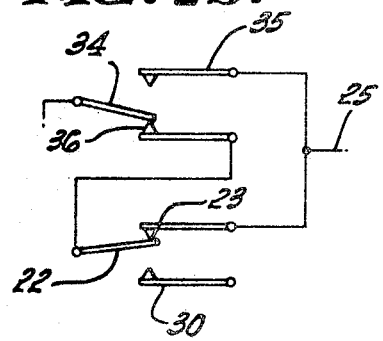
INVENTOR.
HAROLD W. HASENBECK
By White & Haefliger
ATTORNEYS.

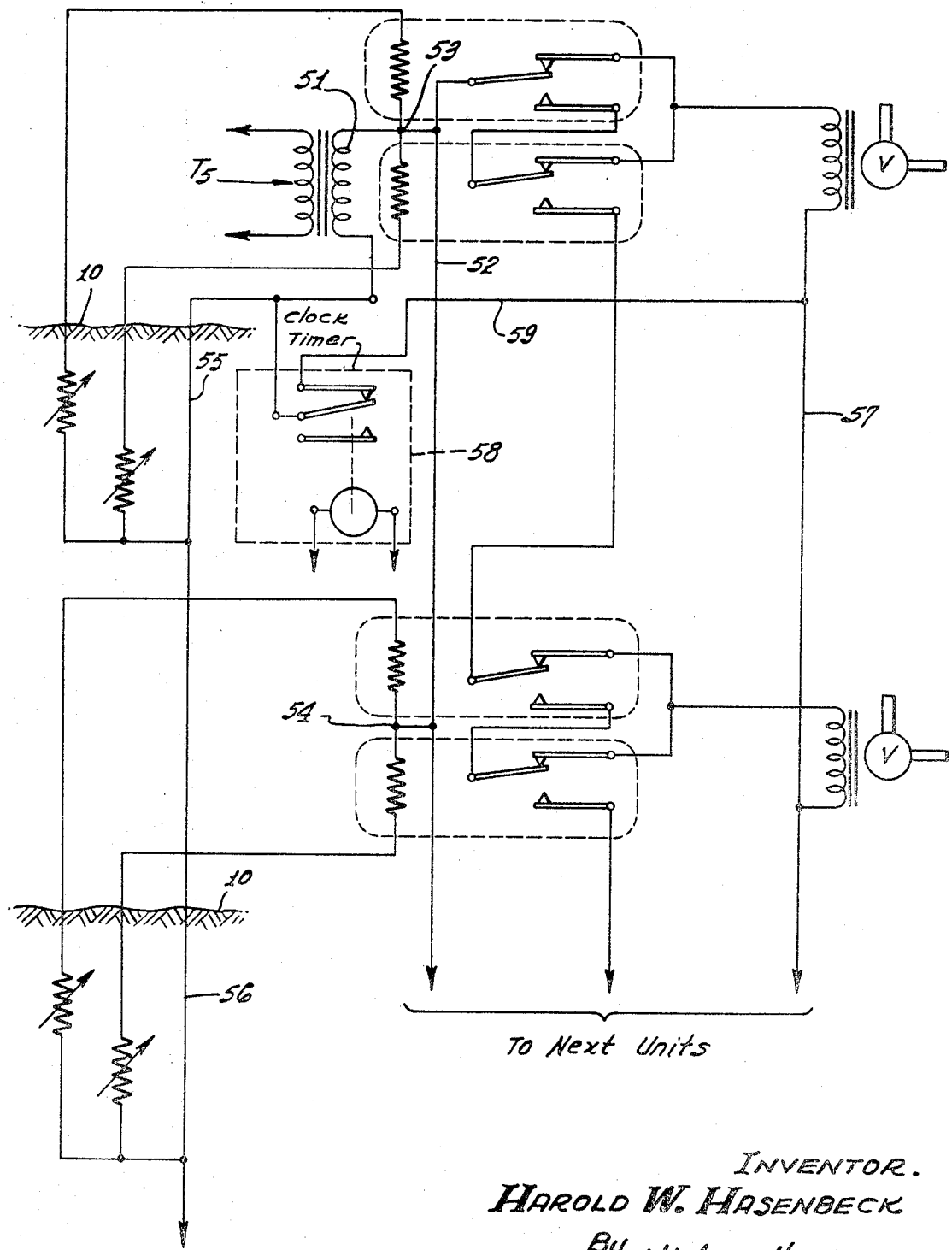

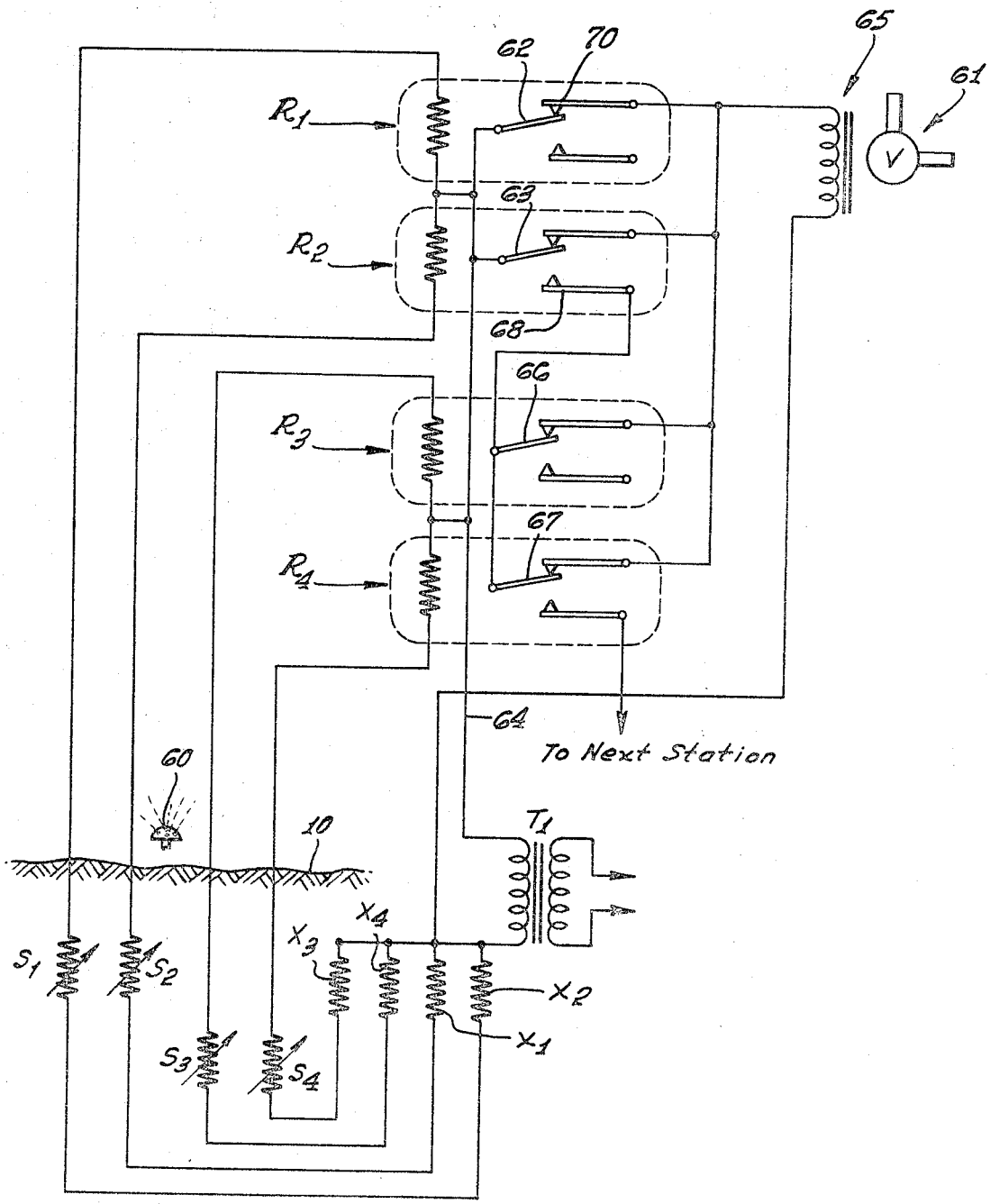

AUTOMATIC SOIL WATERING SYSTEM

BACKGROUND OF THE INVENTION

This invention relates generally to automatic soil moisture control, and more specifically concerns the provision circuitry including sensors and relays in such control to achieve unusually advantageous results.

Those knowledgeable in the field of soil irrigation advocate the supply of water when the moisture content reaches the plant-wilting point. Water should be supplied until the soil is water-saturated to the depth of the plant roots. Water-saturated soil is said to be at field capacity.

There are several key factors to consider in the design of a fully automatic soil-watering system whose operation depends upon a variation in soil moisture content. Tensiometer control, based on the partial vacuum created as moisture is withdrawn from the soil particles by evaporation or transpiration, provides a good indication of soil moisture at a specific depth. However, the time constant of the sensor is several hours. Thus, during the watering cycle, several hours of overwatering can occur before the turnoff is activated. Also tensiometers require frequent attention to restore the required column of water in the vacuum system.

Another alternative concerns the use of soil moisture sensors that measure soil resistance change as a function of moisture. Such devices, however, will not remain in calibration because the soil resistance changes as a function of salt buildup, the addition of fertilizer, the buildup of organic compounds and leaching action.

SUMMARY OF THE INVENTION

It is a major object of the invention to overcome the above-mentioned problems, as well as others, through the provision of a system that utilizes the principle of heat transfer as a function of soil moisture in an unusually advantageous manner. The moisture in soil varies from approximately 30 percent by weight at field capacity to about 10 percent at the wilting point (10 p.s.i. suction), and it has been found possible to use a sensor or sensors that indicate the point of field capacity and the point of 10 percent moisture, based upon variation of heat transfer of a heated linear or nonlinear resistance element. Also, the operation of such sensors is not affected by soil additives or leaching action, and is only affected by variation in soil moisture content surrounding the sensors.

Basically, the invention is embodied in a combination that comprises a first sensor adapted to be located underground and having an electrical current controlling resistance characterized as changing in response to a change in the rate of heat loss from the sensor induced by a change in the moisture content of the underground formation surrounding the sensor; and means for effecting electrical current flow to be controlled by changes in such resistance and responsive to a change in such current for controlling an irrigation water valve. As will appear, such means may typically include a valve controlling actuator (as for example a solenoid), and a first relay connected with the sensor and in controlling relation with the actuator to operate the latter to open the valve in response to a predetermined decrease in such current flow corresponding to relative drying of the formation adjacent the sensor. Further, the combination may advantageously include a second sensor of the same type but adapted to be located underground at a level different from that of the first sensor, and a second relay connected with the second sensor and in controlling relation with the actuator to operate the latter to open the same valve in response to a decrease in second-sensor current flow corresponding to relative drying of the formation adjacent the second sensor.

Additional objects and advantages include the location of the first and second sensors at upper and lower underground levels; the provision of contact interconnection of the relays characterized in that only a single source of power is needed to be controllably connected with the actuator in response to operation of either relay; the provision of the single source of power in the form of a transformer winding which is also connectable with the sensors to supply their currents; the provision of a separate transformer winding to energize the sensors; the provision of another pair of sensors, another pair of relays and another actuator, the two pairs of relays having electrical connection whereby a single source of power is operable to energize either actuator to valve open position via the relays; the provision of a timer as will be described; the provision of a single source of power across which pairs of sensors as described are connected in parallel; and provision for resistance controlled weighting of sensor operation of associated relays.

These and other objects and advantages of the invention, as well as the details of illustrative embodiments, will be more fully described in the following specification and drawings, of which:

BRIEF DESCRIPTION OF DRAWINGS

FIG. 1 is a circuit diagram illustrating an irrigation water control system using one sensor;

FIG. 1a illustrates a battery source of power;

FIG. 2 is a circuit diagram illustrating an irrigation water control system using two sensors;

FIG. 2a represents the condition of switches R1 and R2 when sensor 14a has sensed a dry condition.

FIG. 2b represents the condition of switches R1 and R2 when sensor 14 has sensed a dry condition.

FIG. 4 is a circuit diagram for soil moisture control of separated sensor locations, using only one transformer to supply power to the sensors and associated water flow controlling solenoids; and FIG. 5 is a circuit diagram for soil moisture control wherein additional sensors and relays, along with weighting resistors, are used for even better control.

DESCRIPTION OF PREFERRED EMBODIMENTS

Figure 3:
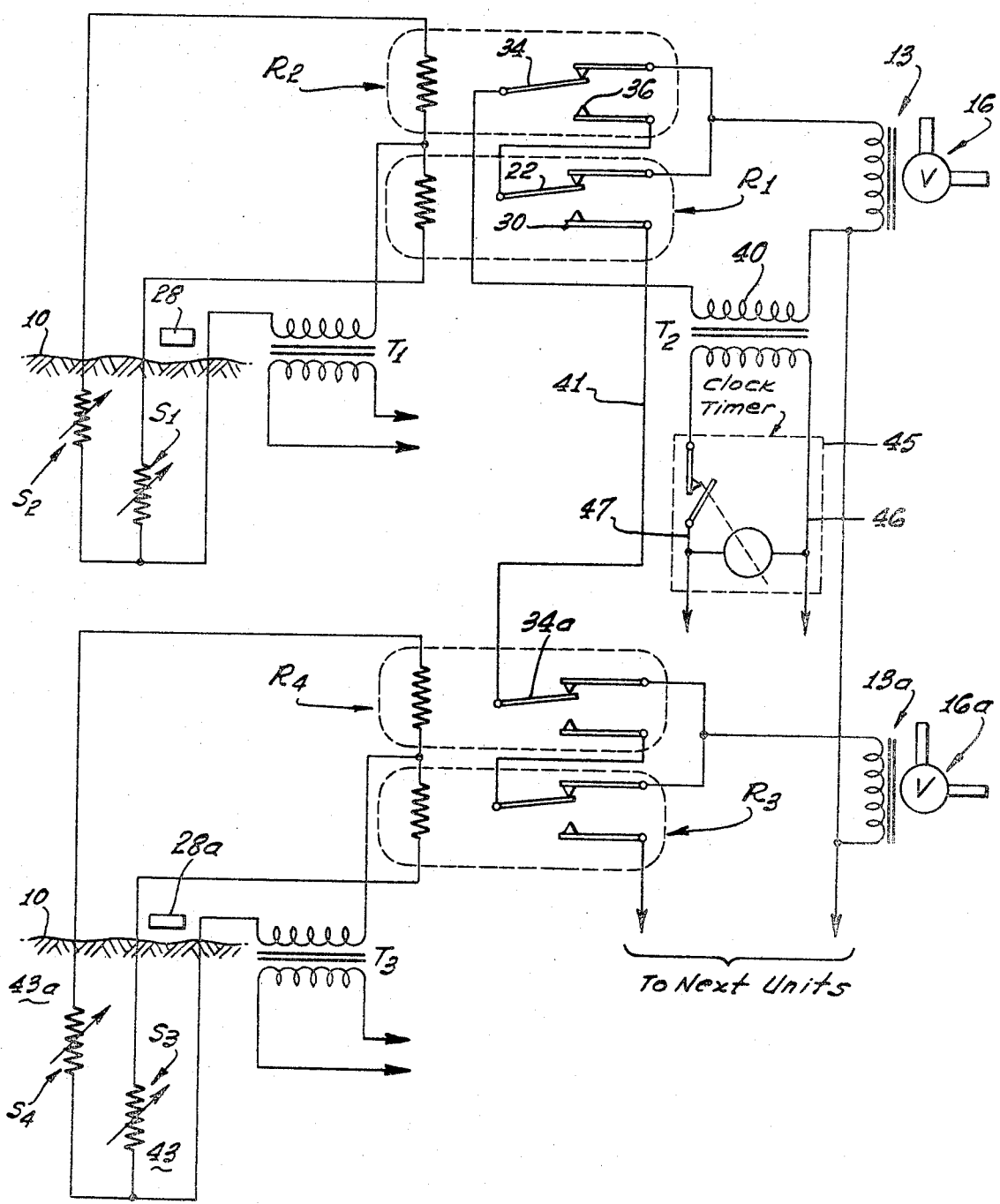
FIG. 3 is a circuit diagram of soil moisture control of separated sensor locations, with isolation of the sets of sensors by separate transformers.

Referring first to FIG. 1, a first sensor $S_1$ is shown as located underground below surface 10, and having an electrical current controlling resistance such as resistance 11 characterized in changing (linearly or nonlinearly) in response to a change in the rate of heat loss from the sensor. Heat is generated by current flow through the resistance 11 and its rate of loss to the underground formation 14 depends upon the moisture content of that adjacent formation, a change in that content effecting a change in the rate of heat loss and hence a change in the resistance of the sensor. One such resistor is identified as the "Positemp" bead thermistor, a product of Pennsylvania Electronics Technology, Inc. 1397 Frey Road, Pittsburgh, Pennsylvania. See also Amperex Electronic Corporation publication dated Oct. 1966, pages G67—G76, entitled "PTC Thermistors."

Means is also provided for effecting electrical current flow to be controlled by changes in such resistance, and responsive to such a current change for controlling an irrigation water valve. In the illustrated example, such means includes a valve controlling actuator (as for example solenoid 13) and a first current sensitive relay $R_1$ connected with the sensor $S_1$ and in controlling relation with the actuator to operate the latter to open the water valve 16 in response to a decrease in current flow through the sensor corresponding to relative drying of the formation. Such means may also be considered to include the leads 15 and 17 defining a circuit loop into which are connected the fixed resistance 18 of the relay (electromagnetic or thermal) 19, and the winding 20 of input transformer 21. Instead of a transformer, a DC source such as a battery may be connected in the loop as seen in FIG. 1a.

In operation as the soil moisture decreases, due to transpiration and evaporation, the heat transfer from the sensor $S_1$ decreases, increasing the electrical resistance and temperature of the sensor to decrease the current flowing through relay element 19 until the relay $R_1$ deactivates and the arm 22 moves to engage contact 23 to connect the solenoid coil 24 in series with the transformer winding 20 via leads 25 and 26. The solenoid is thereby energized and its plunger opens the valve to start the watering cycle. In this regard, it will be understood that the sprinkler 28 is connected with the water piping 29 controlled by valve 16, and water from the sprinkler drains into the formation 14. Later, when the moisture level in the formation adjacent sensor $S_1$ has risen to a predetermined level, heat transfer from sensor $S_1$ increases to decrease the sensor resistance and temperature, thereby increasing the current through relay element 19, switching arm 22 to engage contact 30, resulting in shutting of valve 16 and cessation of irrigation.

Extending the description to FIG. 2, the elements of FIG. 1 are included, and in addition a second sensor $S_2$ is provided at an underground level different from that of the first sensor $S_1$ and as an example $S_2$ is higher than $S_1$. Typically, but not necessarily, both $S_1$ and $S_2$ are located in the formation which receives drainage of water from a supply which is either "on" with respect to both sensors, or "off" with respect to both sensors.

A second relay $R_2$ is connected with the second sensor $S_2$ and in controlling relation with the actuator (for example solenoid winding 24) to operate the actuator to open the valve in response to a decrease in sensor current flow corresponding to relative drying of the formation 14a adjacent the second sensor. Note in this regard that the sensor relay has an element 32 with fixed resistance 33, arm 34, and contacts 35 and 36.

It is a further and advantageous feature of that form of the invention typified by FIG. 2 that the first and second relays have contact interconnection characterized in that a single solenoid valve will respond to operation of either relay. In the illustration, power lead or line 26 is connected with arm 34 of relay $R_2$, that relay having one contact 35 connected with the solenoid coil 24 via lead 25 and another contact 36 connected to arm 22 of the other relay $R_1$. Further, contact 23 of relay $R_1$ is also connected with the solenoid coil as illustrated and contact 30 is not used.

In operation, when the soil dries to a predetermined low moisture condition at the location of either sensor $S_1$ or $S_2$, the current through its associated relay will reduce to the point of relay deactivation, closing the "normally closed" contacts. FIG. 2a illustrates the arm and contact connections for operating the solenoid to open the valve when the upper formation 14a dried sufficiently; and FIG. 2b illustrates the arm and contact connections for operating the solenoid to open the valve when the lower formation 14 dries sufficiently. It should be noted that the relays and solenoid are wired in such a way that the upper formation 14a near sensor $S_2$, can be watered, and the water then shut off, without watering to the depth of the lower formation 14 near sensor $S_1$. Also, the lower level sensor $S_1$, can start the watering cycle even though the upper level formation 14a may have sufficient moisture.

FIG. 3 illustrates a system including two pairs of sensors $S_1$ and $S_2$, and $S_3$ and $S_4$, each pair like the sensors of FIG. 2, but the two pairs being located at horizontally displaced underground locations. There are also corresponding relay pairs $R_1$ and $R_2$, and $R_3$ and $R_4$, corresponding actuators 13 and 13a; and actuator controlled valves 16 and 16a, which independently control water supply to spaced sprinklers 28 and 28a.

The relay pairs have electrical interconnection such that the single source of power (typified by transformer winding 40) is operable to energize either actuator 13 or actuator 13a to valve open position, via the relays. In the example, the unused relay contact is connected at 41 with arm 34a of relay $R_4$ to supply power to that relay and relay $R_3$ when arm 34 engages contact 36 of $R_2$ and arm 22 engages contact 30 or $R_1$. Accordingly, water can be supplied to the formations 43 and 43a associates with sensors $S_3$ and $S_4$ only if water is not being supplied to formation 14 and 14a associated with sensors $S_1$ and $S_2$, preventing watering of more than one area at a time; however, the system will allow watering at either location, when needed. In the event both areas require water at the same time, the area nearest the unit containing the transformer $T_2$ will be watered first. Note that separate transformers $T_1$ and $T_3$ are used to supply power to the sensor pair $S_1$ and $S_2$ and to the sensor pair $S_3$ and $S_4$, respectively. If watering must be prevented, except during certain hours, a timer clock 45 may be used in series with the input power lines 46 and 47 to transformer $T_3$.

FIG. 4 is like FIG. 3, excepting that a single transformer $T_5$ is operable to supply power to all sensors $S_1$—$S_4$ etc. This may be implemented by connecting one terminal of the winding 51 with bus 52 that services all sensor loops at points 53, 54 etc. and the other terminal of that winding with the underground lean leads 55, 56 etc. Further, power is supplied to the valve actuator solenoids via the point 53, relays $R_1$ and $R_4$ as described in FIG. 3, and bus line 57, a clock timer 58 being connected in the return 59 to the transformer winding 51.

The automatic control system shown in FIG. 5 is basically the same as in FIG. 2, excepting that $S_1$ and $S_2$ are at an upper level serviced by sprinkler 60, and $S_3$ and $S_4$ are at a lower level serviced by the same sprinkler, controlled by valve 61. Also, arms 62 and 63 of relays $R_1$ and $R_2$ are connected to power line 64 to place these relays in series with line 64, solenoid 65, and line 69. Further, weighting resistors $X_1$—$X_4$ are in series with the sensors $S_1$—$S_4$ respectively, as shown. Power is supplied to arms 66 and 67 of relays $R_3$ and $R_4$ when arm 63 engages contact 68 of relay $R_2$.

In operation, $X_1$ is set so that current to relay element $R_1$ is just low enough to switch arm 62 to engage contact 70 when soil moisture at the upper level is a low percentage, say 10 percent. $X_2$ is set so that current to relay element of $R_2$ is just enough to switch arm 63 to engage contact 68 when soil moisture at upper level is at the upper limit, say 30 percent, and only then is power supplied to operate relays $R_3$ and $R_4$, according to the circuitry. In the meantime, arm 62 has independently disengaged contact 70 so that no power is supplied to the solenoid via either relay $R_1$ and $R_2$.

Similarly, the sensors $S_3$ and $S_4$ at the lower level are adjusted, as by resistors $X_3$ and $X_4$, to operate the relays $R_3$ and $R_4$ at the same differential as the sensors at the upper level operate their associated relays.

Accordingly, the arrangement provides for ease of adjusting water valve turnon and turnoff for the desired soil moisture differential, i.e. water turnoff at either level when the soil at that level, is some factor times as moist as the turnon moisture at that level.

I claim:

1. In an irrigation control system, the combination comprising:

first and second sensors located underground at different levels and each having an electrical current controlling resistance characterized as changing in response to a change in the rate of heat loss from the sensor induced by a change in the moisture content of the underground formation adjacent the sensor; and means for effecting electrical current flow to be controlled by changes in said resistance and responsive to a change in such current for controlling an irrigation water valve, said means including a valve controlling actuator, a first relay connected with the first sensor and in controlling relation with the actuator to operate the actuator to open the valve in response to a decrease in said current flow corresponding to relative drying of said formation adjacent the first sensor, and a second relay connected with the second sensor and in controlling relation with the actuator to operate the actuator to open the valve in response to a decrease in second sensor current flow corresponding to relative drying of said formation adjacent the second sensor.

2. The combination of claim 1 wherein the first and second sensors are located underground at lower and upper levels, respectively.

3. The combination of claim 1 wherein the first and second relays have contact interconnections characterized in that a single source of power is connectable with said relays to be controllably connected with said actuator in response to operation of either relay.

4. The combination of claim 3 including a power line connected with one relay arm, said one relay having a pair of contacts, one of which is connected with the actuator and the other of which is connected to the arm of the other relay, said other relay having a pair of contacts, one of which is connected with the actuator.

5. The combination of claim 4 in which said actuator comprises a solenoid with a plunger having valve open and closed positions, said one contact of said one relay and said one contact of said other relay being connected with the solenoid electrical winding to pass current for energizing the solenoid to move the plunger to valve open position.

6. The combination of claim 3 wherein said means comprises said single source of power in the form of a transformer winding which is also electrically connected with said sensors.

7. The combination of claim 3 includes said single source of power in the form of a transformer winding, and said means includes another transformer winding electrically connected with said sensors which are in electrical parallel relation.

8. The combination of claim 3 including another pair of sensors, another pair of relays and another actuator as defined in claim 3, the two pairs of relays having electrical interconnection whereby said single source of power is operable to energize either actuator to valve open position via said relays.

9. The combination of claim 8 including a timer electrically connected to control electrical power application from said source to all of said relays.

10. The combination of claim 1 including another pair of sensors, another pair of relays and another actuator as defined in claim 6, and including said single source of power across which said pairs of sensors are connected in parallel.

11. The combination as defined in claim 1 wherein said means includes a battery power source.

12. In an irrigation control system, the combination comprising:

first and second sensors located underground and each having an electrical current controlling resistance characterized as changing in response to a change in the rate of heat loss from the sensor induced by a change in the moisture content of the underground formation adjacent the sensor; and means for effecting electrical current flow to be controlled by changes in said resistance and responsive to a change in such current for controlling an irrigation water valve, said means including a valve controlling actuator, a first relay connected with the sensor and in controlling relation with the actuator to operate the actuator to open the valve in response to a decrease in said current flow corresponding to relative drying of said formation adjacent the first sensor, a second relay connected with the second sensor and in controlling relation with the actuator to operate the actuator to open the valve in response to a decrease in second sensor current flow corresponding to relative drying of the formation adjacent the second sensor, and there being resistance electrically connected with the sensors such that second sensor current required to operate the second relay is different from the first sensor current required to operate the first relay and by a predetermined factor.

UNITED STATES PATENT OFFICE
CERTIFICATE OF CORRECTION

Patent No. 3,553,481          Dated Jan. 5, 1971

Inventor(s) Harold W. Hasenbeck

It is certified that error appears in the above-identified patent and that said Letters Patent are hereby corrected as shown below:

Column 6, line 2; "in claim 6, and including said single source of power across" should read --in claim 3, and including said single source of power across--

Signed and sealed this 1st day of June 1971.

(SEAL)
Attest:

EDWARD M. FLETCHER, JR.          WILLIAM E. SCHUYLER, JR.
Attesting Officer                 Commissioner of Patents